(12) United States Patent
Qin et al.

(10) Patent No.: US 10,353,465 B2
(45) Date of Patent: Jul. 16, 2019

(54) IRIS AND PUPIL-BASED GAZE ESTIMATION METHOD FOR HEAD-MOUNTED DEVICE

(71) Applicant: South China University of Technology, Guangdong (CN)

(72) Inventors: Hubiao Qin, Guangdong (CN); Shu Fei, Guangdong (CN)

(73) Assignee: South China University of Technology, Guangdong (CN)

( * ) Notice: Subject to any disclaimer, the term of this patent is extended or adjusted under 35 U.S.C. 154(b) by 0 days.

(21) Appl. No.: 15/770,354

(22) PCT Filed: Dec. 23, 2016

(86) PCT No.: PCT/CN2016/111600
§ 371 (c)(1),
(2) Date: Apr. 23, 2018

(87) PCT Pub. No.: WO2017/211066
PCT Pub. Date: Dec. 14, 2017

(65) Prior Publication Data
US 2019/0121427 A1    Apr. 25, 2019

(30) Foreign Application Priority Data

Jun. 8, 2016 (CN) .......................... 2016 1 0409586

(51) Int. Cl.
*G06F 3/01*        (2006.01)
*G06K 9/00*        (2006.01)

(52) U.S. Cl.
CPC ........... *G06F 3/013* (2013.01); *G06K 9/0061* (2013.01); *G06K 9/00604* (2013.01)

(58) Field of Classification Search
CPC ... G06F 3/013; G06K 9/0061; G06K 9/00604
(Continued)

(56) References Cited

U.S. PATENT DOCUMENTS

| 2015/0324568 A1* | 11/2015 | Publicover ............. G06F 21/64 726/19 |
| 2016/0026246 A1 | 1/2016 | Strupczewski et al. |
| 2017/0160798 A1* | 6/2017 | Lanman ................. G06T 5/002 |

FOREIGN PATENT DOCUMENTS

| CN | 101901485 A | 12/2010 |
| CN | 102125422 A | 7/2011 |

(Continued)

OTHER PUBLICATIONS

PCT/CN2016/11600 International Search Report dated Apr. 7, 2017. 2 pages (with English Translation).

(Continued)

*Primary Examiner* — Calvin C Ma
(74) *Attorney, Agent, or Firm* — Joseph E. Maenner; Maenner & Associates, LLC

(57) ABSTRACT

The present invention discloses a gaze estimation method for a headset device based, on iris and pupil. In the method, only a single camera, a single infrared light source and a central calibration point which is each provided within four average regions at a screen are used, 3D modeling of the pupil and iris is performed through an extracted 2D central feature of eye movement, and a 3D gaze direction vector is established and combined with angle information of the gaze direction, so as to estimate a gaze point position of human eyes. Fully taking a characteristic of applying the headset device into account, the present invention guarantees an accuracy of the gaze point estimation in the headset device and meanwhile greatly reduces the complexity of an entire system structure and a calibration process, and provides a solution with high accuracy and little complexity for the gaze tracking in the headset device.

4 Claims, 1 Drawing Sheet

(58) Field of Classification Search
USPC .................. 345/8, 156, 420; 351/158, 209
See application file for complete search history.

(56) References Cited

FOREIGN PATENT DOCUMENTS

| | | |
|---|---|---|
| CN | 105094300 A | 11/2015 |
| CN | 105094337 A | 11/2015 |
| CN | 106056092 A | 10/2016 |

OTHER PUBLICATIONS

PCT/CN201611600 Written Opinion completed Mar. 24 2017. 4 pages (with English Translation).
PCT/CN201/111600 International Search Report dated Apr. 7, 2017. 2 pages (with English translation).

\* cited by examiner

IRIS AND PUPIL-BASED GAZE
ESTIMATION METHOD FOR
HEAD-MOUNTED DEVICE

TECHNICAL FIELD

The present invention relates to a technical field of gaze tracking in human-computer interaction, and specifically relates to a gaze estimation method for a headset device based on iris and pupil.

BACKGROUND OF THE PRESENT INVENTION

Gaze tracking technology, as a most innovative human-computer interaction, has advantages such as high accuracy, simple to use, good stability, little interference to users and the like. Therefore, the gaze tracking technology possesses a wide application prospect in several fields such as medical aided diagnosis, auxiliary equipment for the disabled, advertising and marketing analysis, daily human-computer interaction and the like. Besides, augmented reality is penetrating into people's life increasingly, and how to combine the gaze tracking technology with the augmented reality to establish the visualized augmented reality in real-time interaction has been a focus to which people more and more pay attention.

Augmented Reality (AR) is to augment the reality information in the real world around the user through a 3D registration technology, so as to reach a "seamless" integration between the information of the real world and the information of the virtual world, bringing the user surreal sense experience. In order to provide a simple, efficient and bidirectional interactive mode to an augmented reality system, a combination of the gaze tracking technology with the augmented reality can not only track a gaze direction of the user, acquire an interested region by the user in a scene, but also present a characteristic of the augmented reality system combining virtuality with reality, wherein through a human eye image captured by an infrared camera, the augmented reality system based on a headset display with a gaze tracking function tracks the gaze direction and performs operations such as gaze transferring view, playing music and opening a video, and it has a strong effect of the augmented reality with an important research significance and has attracted extensive attention in recent years.

A structure of a headset gaze tracking system has its particularity. When the human eyes gaze at an object in a space with the head moving randomly, relative positions and distances between the human eyes and the screen as well as the human eyes and the camera remain constant, and there's no need to take an effect of the head's movement on gaze point estimation into account. Thus, a design of the headset gaze tracking system provides a new concept for the research of the technical field of gaze tracking, converting from researching how to avoid the influence of the head's extensive movement during estimating a gaze point position, into researching how to track movement information of the human eyes more simply and accurately inside a small space of the headset system to acquire the gaze direction of the human eyes. To sum up, extracting the eye movement feature accurately under the near-infrared light which represents the gaze direction, and establishing a simple and efficient gaze mapping model have become two key missions in the research of the headset gaze tracking system.

As for the eye movement feature extraction, an extraction effect thereof should satisfy requirements for high accuracy and strong real-time performance. Inside the headset gaze tracking system, the camera is closed to the human eyes and the human eye image captured by it is clear, but an uneven illumination would lead to a difference of the human eye image in the clarity; besides, owing to an effect of a reflector in the system, the human eye image captured by the camera would produce a deformation, and when the eye balls rotate in a relatively large angle, part of the eye movement feature would be covered by the eyelid or eyelash, leading to an incomplete outline or a false outline. At present, an eye movement feature extraction algorithm mostly extracts a feature of the pupil and combines a light spot of corneal reflex or the inner and outer eye corners, to extract the eye movement feature that accurately represents the gaze direction. These algorithms are usually so complicated that the real-time performance of the eye movement feature extraction cannot be guaranteed. Therefore, it has become one of the technical difficulties of the headset gaze tracking system that how to extract the eye movement feature rapidly and accurately under the near-infrared light.

As for establishment of the gaze mapping model, an object thereof is to obtain the gaze point position by using the extracted eye movement feature. Inside the headset gaze tracking system, the position of the camera is fixed, relative to the position of the human eyes, and the head's movement would not make an influence on calculation of the gaze point. However, the user tends to expect to put on the headset easily and use it conveniently when using the system. In the present gaze mapping model, a 2D mapping model algorithm is so simple that there's no need to achieve position information of a system device and that of the user in advance, but a plurality of infrared light sources or several calibration points of a screen are often used to establish a 2D mapping formula; whereas a 3D mapping model algorithm is so complicated that a complicated stereo camera or several cameras are needed to collect the human eye image so as to achieve a mapping relation of a 3D center of eyes and the gaze point of the screen, so that a hardware of the entire gaze tracking system is complicated. Thus, it has become a major technical difficulty existing in the headset gaze tracking system that how to guarantee the high accuracy of the gaze point estimation and meanwhile only a single camera and a single infrared light source are used to establish a simple gaze mapping model during calibration.

SUMMARY OF THE INVENTION

The present invention discloses a gaze estimation method for a headset device based on iris and pupil. In such method, only a single camera, a single infrared light source and a central calibration point which is each provided within four average regions at a screen are used, 3D modeling of the pupil and iris is performed through an extracted 2D central feature of eye movement, and a 3D gaze direction vector is established and combined with angle information of the gaze direction, so as to estimate a gaze point position of human eyes. Fully taking a characteristic of applying the headset device into account, the present invention guarantees an accuracy of the gaze point estimation in the headset device and meanwhile greatly reduces the complexity of an entire system structure and a calibration process.

An objective of the present invention is realized by at least one of the following technical solutions.

The gaze estimation method for a headset device based on iris and pupil, only needs the single camera, the single infrared light source and the central calibration point which is each provided within four average regions at the screen, including following steps:

(1) the eye movement feature extraction: inside the headset device, the human eyes are close to the screen and the camera, a concept of first acquiring an outline of the eye movement feature and then positioning an eye movement feature center is used for a human eye image captured by the camera under a near-infrared light, and as for segmented feature regions of the pupil and iris, 2D central parameters of the pupil and iris are acquired by using an edge detection and an ellipse fitting algorithm;

(2) 3D modeling of the eye movement feature: relative positions and distances between the human eyes and the screen as well as the human eyes and the camera remain constant, and meanwhile the pupil and the iris are not located in the same plane and the iris is in front of the pupil; according to a conversion formula from an image pixel coordinate system to a camera coordinate system, 2D image information of the human eyes, which is captured by the camera when the human eyes observe the central calibration points within four regions at the screen, is combined with position information of the calibration points, and a 3D gaze mapping model is obtained by 3D modeling an eye movement feature vector, i.e. 3D central coordinate parameters of the pupil and iris when the human eyes gaze at the central calibration points within four regions are obtained; and (3) estimation of the gaze point position: when the human eyes gaze at any point on the screen, the central parameters of the pupil and iris extracted from the 2D human eye image are compared with a 2D center of four calibration points to position a gaze region of the human eyes, by using the established 3D gaze mapping model to calculate 3D coordinates of a pupil center and an iris center within the gaze region, a pupil-iris 3D gaze direction vector is obtained and combined with the angle information of the gaze estimation to obtain a final gaze point position of the human eyes.

Further, the step (1) includes:

a. as for an input human eye image, a template matching algorithm is used to initially position a right eye region;

b. as for a feature extraction part of the pupil center, an OTSU algorithm which is combined with a compensation algorithm using a histogram peak as a search threshold, is firstly used to achieve an automatic segmentation of the pupil region, and a maximum connected region search algorithm is used to eliminate a noise block on a binary image of the pupil, an edge of the pupil is obtained by using a Sobel edge detection, and finally central parameter information of the pupil is acquired through a RANSAC ellipse fitting algorithm;

c. as for a feature extraction part of the iris center, an iris-interested region is determined by using a feature extraction center of the iris as a center of a ROI region, and a binary image of the iris is acquired by using a digital morphology combined with a histogram iterative algorithm, since upper and lower edges of the iris are easily covered by eyelid and eyelash, after a vertical edge information of the iris is acquired by using the Sobel vertical edge detection, central parameter information of the iris is obtained through the ellipse fitting.

Further, the step (2) includes:

a. calibration of an intrinsic parameter of the camera, wherein Zhang's plane calibration is used, and the intrinsic parameter of the camera is calibrated through a checkerboard pattern at different angles and distances shot by the camera at a fixed position, to acquire parameter information of a zoom factor in the conversion formula from a 2D image coordinate system of an object to the camera coordinate system;

b. a gaze screen is divided into four regions with the same size and the center of each region is provided with one calibration point, by substituting a 2D' central coordinate of the pupil and a known depth information value of the pupil, i.e. a distance from a 3D center of the pupil to an optical center of the camera, into the formula in step a, the 3D coordinate parameter of the pupil is obtained;

c. according to a geometric similarity between the gaze direction of the human eyes in an iris plane and the gaze in a projection of the screen, a depth information value of the iris is calculated by using the coordinate of the calibration point on the screen and the 3D coordinate of the pupil acquired in step b, and then by substituting a 2D central coordinate of the iris and the depth information value of the iris into the formula in step a, the 3D coordinate parameter of the iris is obtained.

Further, the step (3) includes:

a. when the human eyes gaze at any point on the screen, the extracted 2D central coordinate of the pupil is compared with the 2D center of the pupil which corresponds to four calibration points, to position the gaze region of the human eyes;

b. according to a characteristic that the pupil center and the iris center are non-concurrent in the 3D space leading to that the pupil center and the iris center are non-collinear in the 2D plane, the angle information of the human eye gaze estimation is acquired by using the 2D central coordinates of the pupil and iris;

c. the 3D coordinates of the pupil center and the iris center within the gaze region are calculated by using the 3D gaze mapping model established in step (2), the pupil-iris 3D gaze direction vector is obtained and combined with the angle information of the gaze estimation to obtain the final gaze point position of the human eyes.

Further preferably, the step (1) includes:

as for the human eye image acquired from the camera, the template matching algorithm is used to position the right eye region; as for the positioned right eye region, in order to achieve accurate central parameter information of the pupil, the OTSU which is combined with the compensation algorithm using the histogram peak as the search threshold, is used to determine a segmented threshold value of the pupil, and an image connected region search algorithm is used to eliminate the noise block on the binary image of the pupil, the edge of the pupil is obtained by using the Sobel edge detection, and, then the central parameter information of the pupil is acquired through the RANSAC ellipse fitting; after the feature parameter of the pupil is accurately extracted, the iris-interested region is determined by using the pupil center as the center of ROI region, and the binary image of the iris is acquired by using the digital morphology combined with the histogram iterative algorithm, and after the vertical edge information of the iris is acquired by using the Sobel vertical edge detection, the central parameter information of the iris is obtained through the ellipse fitting.

Further preferably, the step (2) includes:

the gaze screen is divided into four regions with the same size and the center of each region is provided with one calibration point, the 2D central coordinates of the pupil and iris when the human eyes gaze at four calibration points respectively are extracted through step (1); the intrinsic parameter of the camera is calibrated by using the Zhang's plane calibration, and the parameter of the zoom factor in the conversion formula from the image pixel coordinate system to the camera coordinate system is acquired; by substituting the 2D central coordinate of the pupil and the known depth information value of the pupil into the formula, the 3D coordinate parameter of the pupil is obtained; according, to the geometric similarity between the gaze direction in the iris plane and that in the projection of the screen, the depth information value of the iris is calculated by using the acquired 3D center of the pupil and the coordinate of the calibration point on the screen, and the depth information value of the iris as well as the 2D central coordinate of the iris is substituted into the formula to acquire the 3D central coordinate information of the iris.

Further preferably, the step (3) includes:

when the human eyes gaze at any point on the screen, the 2D central coordinate of the pupil extracted in step (1) is compared with the 2D center of the pupil which corresponds to four calibration points, to position the gaze region of the human eyes; according to a principle that the pupil center and the iris center are non-concurrent in the 3D space leading to that the pupil, center and the iris center are non-collinear in the 2D plane, the angle information of the human eye gaze estimation is acquired by using the 2D central coordinates of the pupil and iris; the angle information of the gaze estimation is combined with the pupil-iris 3D gaze direction vector to obtain the final gaze point position of the human eyes.

Compared with the prior art, advantages and positive effects of the present invention lie in that:

1. Accurate and rapid eye movement feature extraction. Accurate eye movement feature extraction is a basis of guaranteeing each performance of the gaze tracking system. At present, an eye movement feature extraction algorithm mostly extracts the pupil center, combining with the Purkinje image or the inner and outer eye corners as the eye movement feature. Inside the headset gaze tracking system, the infrared light source and a reflector would leads to an uneven contrast ratio of the human eye image and deformation of the human eye image, resulting in that the extracted eye movement feature cannot reflect an actual variation of the human eye movement. The present invention selects stable features of the pupil and iris as the eye movement feature for the gaze tracking of the headset device, uses the concept of first acquiring the outline of the eye movement feature and then positioning the eye movement feature center, realizes accurate segmentation of the pupil region based on the traditional OTSU algorithm which is combined with the compensation algorithm using the histogram peak as the search threshold, acquires the segmented threshold value of the iris by using the histogram iterative algorithm, extracts the central feature parameters of the pupil and iris respectively by using the Sobel edge detection and the RANSAC ellipse fitting algorithm, and satisfies requirements of the headset gaze tracking system for the accuracy and real-time performance of the eye movement extraction.

2. Accurate and efficient establishment of the gaze mapping model. A final objective of the gaze tracking system is to estimate the gaze point position of the human eyes by using the established gaze mapping model. At present, in the gaze mapping model, the 2D gaze mapping model is simple, and has high accuracy of gaze point estimation when the head holds still, but the establishment of the mapping model needs assistance of a plurality of infrared light sources or several calibration points. The 3D gaze mapping model is complicated, and in order to acquire an accurate estimated gaze point position by using the 3D information of eyes directly, it often needs a plurality of cameras and several infrared light sources cooperating with each other for use. The above two gaze mapping models increase the complexity of the system at a certain extent and are limited in being applied in the headset gaze tracking system. Sufficiently taking a characteristic that the relative positions and distances between the human eyes and the gaze screen as well as the human eyes and the camera remain constant in the headset gaze tracking system, into account, the present invention proposes an innovative 3D gaze mapping model based on the pupil and the iris when only the single camera, the single infrared light source and four calibration points which are each provided within the specified regions at the screen are used. The 3D modeling of the pupil and iris is performed through the extracted 2D central feature of the eye movement, and the 3D gaze direction vector is established and combined with the gaze angle information, so as to estimate the gaze point position of the human eyes. Such mapping model has generality for different users, guarantees the accuracy of the gaze point estimation in the headset gaze tracking system and meanwhile greatly reduces the complexity of the entire system structure and the calibration process.

DETAILED DESCRIPTION OF THE PREFERRED EMBODIMENT

Specific implementations of the present invention will be further described by accompanied drawings in combination with an embodiment, but the implementation and the protection of the present invention are not limited to these.

In the present invention, a camera and an infrared light source are fixed near the head with a headset device, wherein the camera which captures a human eye image has a resolution ratio of 640*480, and an infrared camera has a power of 3 W and a wavelength of 850 mm.

Figure 1:
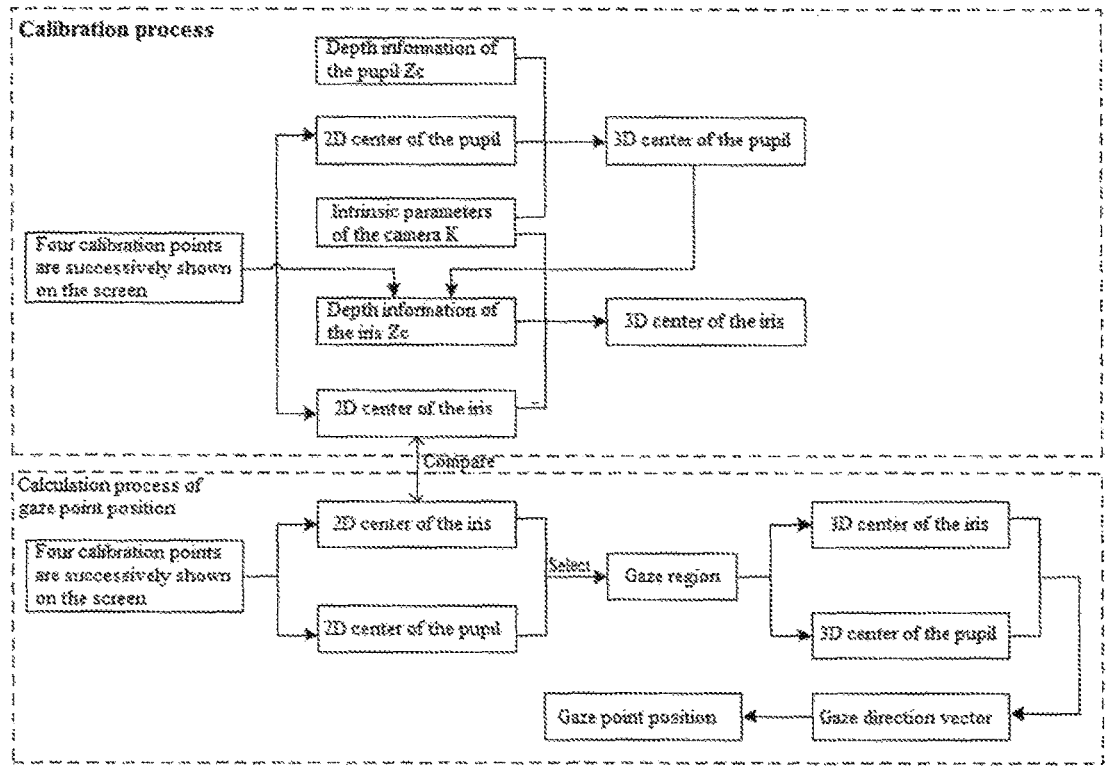
FIG. 1 is an overall frame diagram of establishment of a gaze mapping model in the embodiment.

As shown in FIG. 1, establishment of a gaze mapping model for the headset device based on pupil and iris includes following implementation steps:

step 1: eyes gaze at four calibration points on a screen and eye movement feature information is extracted;

step 2: the eye movement features of the pupil and iris are 3D modeled;

step 3: eyes gaze at 16 gaze points on the screen and a gaze point position is estimated with the established 3D gaze mapping model.

Figure 2:
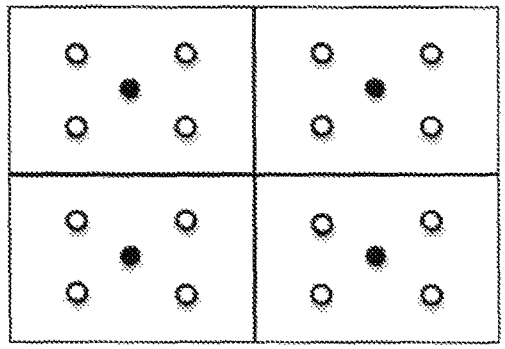
FIG. 2 is a distribution diagram of fixed points (4 calibration points and 16 gaze points) on a screen in the embodiment.

Particularly, specific implementation steps of the step 1 include:

1. After the observer puts on the headset device, the eyes successively gaze at four calibration points on the screen ahead, wherein a distribution diagram of the calibration point is shown as FIG. 2 and the calibration points are the center points within four regions with the same size on the screen.

2. The eye movement feature information is extracted when the eyes gaze at the calibration points: as for each calibration point, pupil center and iris center are respectively extracted as the eye movement feature information, wherein specific implementation steps include:

2.1 Positioning of a Monocular Region

Inside the headset gaze tracking system, the infrared light source is close to the human eyes and the camera only captures the human eye image, rather than a whole human face. However, a gaze tracking algorithm of the present, invention is based on monocular data information, therefore a template matching algorithm, is first used in the present invention to position a right eye region before the eye movement feature is extracted.

2.2 Feature Extraction of the Pupil Center a. A dark pupil effect in the human eye image is apparent under the near-infrared light and a pupil region shows a characteristic of an apparent black spot. In order to eliminate an influence of an image noise on the feature extraction of the pupil, a median filter technology is first used in the present invention to pretreat the human eye image, eliminate part of the noises around the eyes and acquire a human eye image with more apparent details in the pupil region.

b. In the human eye image inside the headset gaze tracking system, feature of the pupil region is apparent but has an uneven contrast ratio to other regions. Therefore in the present invention, after a maximum variance cluster algorithm (OTSU algorithm) is used to acquire a primary segmented threshold value of the pupil region, according to a characteristic of a human eye image histogram, the primary segmented threshold value is compensated through a compensation algorithm using a histogram peak as a search threshold to acquire a final segmented threshold value of the pupil. The pupil region is automatically segmented from a background region to acquire a segmented binary image of the pupil region.

c. The infrared light would generate a reflected light spot on cornea. When the eye balls move, the reflected light spot would appear at three positions which are, exterior of the pupil, interior of the pupil and boundary of the pupil respectively. Especially when the reflected light spot appears on the boundary of the pupil, it would influence the segmentation of the pupil, resulting in a concave of the segmented binary image of the pupil on the reflected light spot, rather than a complete ellipse. In order to acquire effective edge information of the pupil, a Sobel edge detection algorithm is used in the present invention to extract a vertical edge and a horizontal edge respectively, and longest edges in both directions are selected respectively as a result of extracting the edge of the pupil, and as an effective edge point set of a successive ellipse fitting of the pupil.

d. Final feature parameters of a 2D center of the pupil is acquired through continuous iteration by using a RANSAC ellipse fitting algorithm.

2.3 Feature Extraction of the Iris Center a. In the human eye image under the near-infrared light; the pupil region is located within iris region. Therefore, after the pupil center is extracted accurately, in order to eliminate an influence of other regions of the face on the feature extraction of the iris, in the present invention, the pupil center is first taken as a center of an iris-interested region and an iris region is initially positioned with a suitable length as a side, length of a rectangle of the interested region.

b. In order to make a pixel value of the iris region take up a larger gray scale range and distribute uniformly, and to make the iris region has a higher contrast ratio, a histogram equalization algorithm is used in the present invention to non-linear expand the image, to enhance a difference between the iris region and a background gray scale.

c. Owing to that a segmented threshold value of the iris is between the segmented threshold value of the pupil and a maximum value of pixel gray scale, the determined segmented threshold value of the pupil is served as a starting point and a histogram iterative algorithm is used to acquire a segmented binary image of the iris.

d. Compared to a proportion of the pupil region in the human eye image, a proportion of the iris region is larger and upper and lower eyelids are easily covered by the eyelid and eyelash. Therefore, a Sobel vertical edge detection operator is used in the present invention to extract a vertical edge of the iris, and the RANSAC ellipse fitting algorithm is used to perform ellipse fitting on the iris, to acquire feature parameters of a 2D center of the iris.

Particularly, specific implementation steps of the step 2 include:

1. Calibration of Intrinsic Parameters of the Camera

After the human eye image is captured by the camera, a conversion formula from a human eye image pixel coordinate system to a camera coordinate system is as follow:

$$Z_c \begin{bmatrix} u \\ v \\ 1 \end{bmatrix} = \begin{bmatrix} f/dx & 0 & u_0 \\ 0 & f/dy & v_0 \\ 0 & 0 & 1 \end{bmatrix} \begin{bmatrix} X_c \\ Y_c \\ Z_c \end{bmatrix}$$

wherein, coordinate $(u,v)$ represents a column number and a line number of a pixel point of the human eye image in a pixel array, $(dx,dy)$ represents physical dimensions of each pixel in a horizontal axis and a vertical axis respectively, $(u_0,v_0)$ represents an image principal point, and f represents a camera focal length. While $(X_c,Y_c,Z_c)$ represents a 3D position coordinate of the eye movement feature in the camera coordinate system, and $Z_c$ is depth information representing a distance from a 3D center of the human eyes to an optical center of the camera along an optical axis of the camera. Inside the headset device, the camera is always located at the front of the screen and the human face always faces toward the camera, so that it is impossible to calibrate the intrinsic parameters of the camera by continuous movement of the pupil in the plane. According to such characteristic, Zhang's plane calibration is used in the present invention, and the intrinsic parameters of the camera are calculated through 20 planar checkerboard patterns alternating with black and white which are shot by the camera at different angles and distances, to acquire all known parameter information in the establishment process of the gaze mapping model.

2. 3D Modeling of the Eye Movement Feature

The 3D modeling of the eye movement feature is a key of establishing the 3D gaze mapping model. The 3D central coordinates of the pupil and iris are acquired through the 2D central coordinate of the eye movement feature, and the 3D gaze direction vector is constructed to estimate the gaze point position. It can be known from the formula in step 1 that $Z_{c1}$ and $Z_{c2}$, the depth information of 3D positions of the pupil and iris relative to the camera coordinate system, still need to be known to acquire the 3D coordinates of the eye movement feature of the pupil and iris. Owing to that inside the headset gaze tracking device, distances and positions of the head, relative to the screen and the camera, remain constant always, when the human eyes gaze at any point on the screen, variation of central positions of the pupil and iris can be approximately represented as the movement within two small rectangular planes and the depth information $Z_{c1}$ and $Z_{c2}$ of those two remains constant always. Therefore, after the intrinsic parameters of the camera are calibrated and acquired by the camera, in order to reduce an error of the gaze point estimation, the gaze screen is divided into four small regions with the same size followed by the 3D modeling of the eye movement feature, and the 3D coordinates of the pupil and iris when the human eyes gaze at a central point within each small region are acquired respectively.

2.1 Acquiring the 3D Coordinate of the Pupil

The following formulas can be obtained by transforming the formula in step 1:

$$(u_1-u_0) \times Z_{c1} = f_x \times X_{c1}$$

$$(v_1-v_0) \times Z_{c1} = f_y \times Y_{c1}$$

wherein, $(f_x, f_y)$ and $(u_0, v_0)$ are the intrinsic parameters of the camera, $(u_1, v_1)$ is a pixel point position of the 2D center of the pupil in the human eye image, and $(X_{c1}, Y_{c1}, Z_{c1})$ represents the 3D coordinate of the pupil to be acquired. According to the characteristic of the headset device, when the human eyes gaze at different positions on the screen resulting in the variation of the pupil center, provided that the depth information value of the pupil equals to the distance from the human face to the optical center of the camera, such value is known and remains constant always. A process of acquiring the 3D coordinate of the eye movement feature of the pupil, is as follow:

1) the gaze screen is divided into four regions with the same size and the center of each region is provided with one calibration point;

2) the human eye images when the human eyes gaze at four calibration points respectively are captured by the camera, and an eye movement extraction algorithm under the near-infrared light is used to acquire four pixel point position coordinates of the 2D center of the pupil;

3) the 2D central coordinates of the pupil, the depth information of the pupil and the intrinsic parameters of the camera are each substituted into above two formulas, and the 3D coordinate of the pupil can be obtained.

2.2 Acquiring 3D Coordinate of the Iris

The gaze direction of the human eyes can be approximately represented as a line direction through the 3D center of the pupil and the iris center, thus after the 3D central coordinate of the pupil is acquired, in order to obtain the gaze direction, the 3D central coordinate of the iris still needs to be calculated. Owing to that an iris plane is in front of a pupil plane, the depth information of the iris is not equal to that of the pupil. According to a geometric similarity between the pupil center in the iris plane and that in a projection of the screen, the following formulas can be obtained:

$$\frac{Z_{c1} - Z_{c2}}{d} = \frac{\sqrt{(X_{c1} - X_{c2})^2 + (Y_{c1} - Y_{c2})^2}}{\sqrt{(X_{c1} - x)^2 + (Y_{c1} - y)^2}}$$

$$X_{c2} = \frac{(u_2 - u_0) \cdot Z_{c2}}{f_x}$$

$$Y_{c2} = \frac{(v_2 - v_0) \cdot Z_{c2}}{f_y}$$

wherein, d represents a distance from the pupil plane to the screen, (x,y) is a coordinate of the gaze point on the screen, $(u_2, v_2)$ is a pixel point position of the 2D center of the iris in the human eye image, $(X_{c1}, Y_{c1}, Z_{c1})$ represents the 3D coordinate of the pupil that has been acquired in 2.1, and $(X_{c2}, Y_{c2}, Z_{c2})$ is the 3D central coordinate of the iris to be acquired. Therefore, through the above formulas, i.e. through the known coordinate of the gaze point on the screen, the corresponding 3D central coordinate of the pupil and the depth information value of the pupil, the depth information value of the iris can be first calculated and substituted into the above two formulas at the below to obtain the 3D coordinate of the iris.

Particularly, specific implementation steps of the step 3 include:

1. Positioning of a Gaze Region of the Human Eyes

The human eyes gaze at 16 gaze points on the screen respectively, and the extracted 2D central coordinate of the pupil is compared with the 2D central coordinate of the pupil which corresponds to four calibration points, to position the gaze region of the human eyes. To reduce a range of the gaze region, accuracy of the gaze point position estimation is enhanced. After the gaze point region is positioned, according to the formula of 2.1 in step 2, owing to that the depth information of the pupil and the depth information of the iris remain constant when the human eyes move, when the human eyes move resulting in the movement of the 3D central positions of the pupil and iris, the corresponding 2D centers of the pupil and iris vary in the image plane as well. Therefore, the 3D central coordinates of the pupil and iris can be obtained through the following formulas:

$$\frac{u' - u_0}{u - u_0} = \frac{X'_c}{X_c}$$

$$\frac{v' - v_0}{v - v_0} = \frac{Y'_c}{Y_c}$$

wherein, (u,v) is the 2D central coordinate of the pupil (iris) corresponding to the calibration point in the positioned gaze region, (u',v') is the 2D central coordinate of the pupil (iris) corresponding to the gaze point; $(X_c, Y_c)$ is a 3D central coordinate component of the pupil (iris) corresponding to the calibration point in the positioned gaze region, and $(X_c', Y_c')$ is the 3D central coordinate of the pupil (iris) corresponding to the gaze point to be acquired.

2. Acquiring of Angle Information of the Gaze Estimation

According to a mapping principle from the 3D space to the 2D space, a spinning circle in the 3D space shows an ellipse outline when mapped to the 2D space. Therefore, when the human eyes gaze at an object in the space so that the eye balls move, there are relationships of reciprocal representation between the 3D gaze direction, the 3D center of the pupil and the 2D center of the pupil, and thus an angle value of the gaze deviating the x-y plane can be obtained through the 2D central coordinate of the pupil (u,v), with the formula shown as follow:

$$\varphi = \tan^{-1}(v/u)$$

Because when the human eyes observe an object in the space region ahead, the angle in which the eye balls move varies in a certain range. When the angle that deviates the z axis is the same and the angle that deviates the x-y plane differs 180 degree, a size and a shape of a 2D-mapped ellipse of the pupil is the same. A second eye movement feature (the 2D central coordinate of the iris) is needed at this moment to construct a pupil-iris compensated vector to eliminate an interference angle therein which is opposite the actual gaze direction, and calculation formulas thereof are shown as follows:

$$\varphi = \tan^{-1}(\bar{v} - v/\bar{u} - u)$$

$$\phi = \begin{cases} \varphi_1 = \tan^{-1}(v-u), & |\varphi_1 - \varphi| < |\varphi_2 - \varphi| \\ \varphi_2 = \tan^{-1}(v-u) - \pi, & |\varphi_1 - \varphi| < |\varphi_2 - \varphi| \end{cases}$$

wherein, (u,v) represents the 2D central coordinate of the pupil and $(\bar{u},\bar{v})$ represents the 2D central coordinate of the iris. The compensated angle is compared with two angle information acquired, and the angle that is closest to the gaze compensated angle is selected as an angle information value of the gaze estimation finally acquired.

3. Calculation of the Gaze Point Position:

When the human eyes gaze at any point on the screen, the gaze point position is obtained by the gaze direction through a line that is between the 3D center of the pupil and the 3D center of the iris, crossing the screen. A projected vector of the gaze direction vector in the x-y plane is calculated first, and then it is combined with the angle information of the gaze direction to obtain a final gaze point position on the screen, and calculation formulas thereof are shown as follows:

$$\sqrt{(X_{c1} - x)^2 + (Y_{c1} - y)^2} = \frac{\sqrt{(X_{c1} - X_{c2})^2 + (Y_{c1} - Y_{c2})^2} \cdot d}{Z_{c1} - Z_{c2}}$$

$$(Y_{c1} - y) = (X_{c1} - x) \cdot \tan(\phi)$$

wherein, $(X_{c1}, Y_{c1}, Z_{c1})$ is the 3D central coordinate of the pupil, $(X_{c2}, Y_{c2}, Z_{c2})$ is the 3D central coordinate of the iris, d is the distance from the pupil plane to a screen plane, and $\phi$ is the angle information of the gaze direction. Therefore, through the 3D center of the pupil and the 3D center of the iris obtained in the first step in step 3, by combining the angle information of the gaze direction and the distance from the pupil to the screen, a coordinate of the gaze point position on the screen can be accurately acquired, so as to guarantee the accuracy of the gaze point estimation and meanwhile greatly reduce the complexity of the system structure and the calibration process.

What is claimed:

1. A gaze estimation method for a headset device based on iris and pupil, which only needs a single camera, a single infrared light source and a central calibration point which is each provided within four average regions at a screen, characterized in that the method includes following steps:

(1) eye movement feature extraction: inside the headset device, human eyes are close to the screen and the camera, a concept of first acquiring an outline of the eye movement feature and then positioning an eye movement feature center is used for a human eye image captured by the camera under a near-infrared light, and as for segmented feature regions of the pupil and iris, 2D central parameters of the pupil and iris are acquired by using an edge detection and an ellipse fitting algorithm;

(2) 3D modeling of the eye movement feature: relative positions and distances between the human eyes and the screen as well as the human eyes and the camera remain constant, and meanwhile the pupil and the iris are not located in the same plane and the iris is in front of the pupil; according to a conversion formula from an image pixel coordinate system to a camera coordinate system, 2D image information of the human eyes, which is captured by the camera when the human eyes observe the central calibration points within four regions at the screen, is combined with position information of the calibration points, and a 3D gaze mapping model is obtained by 3D modeling an eye movement feature vector, i.e. 3D central coordinate parameters of the pupil and iris when the human eyes gaze at the central calibration points within four regions are obtained; and (3) estimation of a gaze point position: when the human eyes gaze at any point on the screen, the central parameters of the pupil and iris extracted from the 2D human eye image are compared with a 2D center of four calibration points, to position a gaze region of the human eyes, by using the established 3D gaze mapping model to calculate 3D coordinates of a pupil center and an iris center within the gaze region, a pupil-iris 3D gaze direction vector is obtained and combined with angle information of the gaze estimation to obtain a final gaze point position of the human eyes.

2. The gaze estimation method for the headset device based on the iris and the pupil according to claim 1, wherein the step (1) includes:

a. as for an input human eye image, a template matching algorithm is used to initially position a right eye region;

b. as for a feature extraction part of the pupil center, first an OTSU algorithm which is combined with a compensation algorithm using a histogram peak as a search threshold, is used to achieve an automatic segmentation of the pupil region, and a maximum connected region search algorithm is used to eliminate a noise block on a binary image of the pupil, an edge of the pupil is obtained by using a Sobel edge detection, and finally central parameter information of the pupil is acquired through a RANSAC ellipse fitting algorithm;

c. as for a feature extraction part of the iris center, an iris-interested region is determined by using a feature extraction center of the iris as a center of a ROI region, and a binary image of the iris is acquired by using a digital morphology combined with a histogram iterative algorithm, since upper and lower edges of the iris are easily covered by eyelid and eyelash, after a vertical edge information of the iris is acquired by using the Sobel vertical edge detection, central parameter information of the iris is obtained through the ellipse fitting.

3. The gaze estimation method for the headset device based on the iris and the pupil according to claim 1, wherein the step (2) includes:

a. calibration of an intrinsic parameter of the camera, wherein Zhang's plane calibration is used, and the intrinsic parameter of the camera is calibrated through a checkerboard pattern at different angles and distances shot by the camera at a fixed position, to acquire parameter information of a zoom factor in the conversion formula from a 2D image coordinate system of an object to the camera coordinate system;

b. a gaze screen is divided into four regions with the same size and the center of each region is provided with one calibration point, by substituting a 2D central coordinate of the pupil and a known depth information value of the pupil, i.e. a distance from a 3D center of the pupil to an optical center of the camera, into the formula in step a, the 3D coordinate parameter of the pupil is obtained;

c. according to a geometric similarity between the gaze direction of the human eyes in an iris plane and the gaze in a projection of the screen, a depth information value of the iris is calculated by using the coordinate of the calibration point on the screen and the 3D coordinate of the pupil acquired in step b, and then by substituting a 2D central coordinate of the iris and the depth information value of the iris into the formula in step a, the 3D coordinate parameter of the iris is obtained.

4. The gaze estimation method for the headset device based on the iris and the pupil according to claim 1, wherein the step (3) includes:
  a. when the human eyes gaze at any point on the screen, the extracted 2D central coordinate of the pupil is compared with the 2D center of the pupil which corresponds to four calibration points, to position the gaze region of the human eyes;
  b. according to a characteristic that the pupil center and the iris center are non-concurrent in the 3D space leading to that the pupil center and the iris center are non-collinear in the 2D plan; the angle information of the human eye gaze estimation is acquired by using the 2D central coordinates of the pupil and iris;
  c. the 3D coordinates of the pupil center and the iris center within the gaze region are calculated by using the 3D gaze mapping model established in step (2), the pupil-iris 3D gaze direction vector is obtained and combined with the angle information of the gaze estimation to obtain the final gaze point position of the human eyes.

* * * * *

UNITED STATES PATENT AND TRADEMARK OFFICE
CERTIFICATE OF CORRECTION

PATENT NO. : 10,353,465 B2  
APPLICATION NO. : 15/770354  
DATED : July 16, 2019  
INVENTOR(S) : Hubaio Qin and Shu Feng Page 1 of 1

It is certified that error appears in the above-identified patent and that said Letters Patent is hereby corrected as shown below:

On the Title Page

Please correct the spelling of Inventor Hubaio Qin's name to --Huabaio Qin--.

Signed and Sealed this
First Day of October, 2019

Andrei Iancu
*Director of the United States Patent and Trademark Office*